US011363450B2

United States Patent
Koskela et al.

(10) Patent No.: US 11,363,450 B2
(45) Date of Patent: Jun. 14, 2022

(54) PAGING AREA UPDATE FAILURE HANDLING

(71) Applicant: Nokia Technologies Oy, Espoo (FI)

(72) Inventors: Jarkko Koskela, Oulu (FI); Jussi-Pekka Koskinen, Oulu (FI); Ilkka Keskitalo, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 292 days.

(21) Appl. No.: 16/329,944

(22) PCT Filed: Sep. 11, 2017

(86) PCT No.: PCT/FI2017/050644
§ 371 (c)(1),
(2) Date: Mar. 1, 2019

(87) PCT Pub. No.: WO2018/060548
PCT Pub. Date: Apr. 5, 2018

(65) Prior Publication Data
US 2020/0336888 A1    Oct. 22, 2020

Related U.S. Application Data

(60) Provisional application No. 62/401,488, filed on Sep. 29, 2016.

(51) Int. Cl.
*H04W 4/00* (2018.01)
*H04W 8/24* (2009.01)
(Continued)

(52) U.S. Cl.
CPC ............. *H04W 8/24* (2013.01); *H04W 48/16* (2013.01); *H04W 68/005* (2013.01); *H04W 76/18* (2018.02)

(58) Field of Classification Search
CPC ....... H04W 8/24; H04W 76/18; H04W 48/16; H04W 68/005
See application file for complete search history.

(56) References Cited

U.S. PATENT DOCUMENTS 9,198,083 B1    11/2015 Rai et al.
2002/0193110 A1    12/2002 Julka et al.
(Continued)

FOREIGN PATENT DOCUMENTS

CN    104322086 A    1/2015
WO    2013/144614 A1    10/2013

OTHER PUBLICATIONS

Extended European Search Report received for corresponding European Patent Application No. 17855068.7, dated May 12, 2020, 6 pages.
(Continued)

*Primary Examiner* — Justin Y Lee
(74) *Attorney, Agent, or Firm* — Squire Patton Boggs (US) LLP

(57) ABSTRACT

Systems, methods, apparatuses, and computer program products for paging area update (PAU) failure handling are provided. One method may include configuring a user equipment in UE centric mobility mode, wherein failure of a paging area update procedure is handled in an access stratum layer.

12 Claims, 2 Drawing Sheets

(51) Int. Cl.
  *H04W 76/18*  (2018.01)
  *H04W 48/16*  (2009.01)
  *H04W 68/00*  (2009.01)

(56) References Cited

U.S. PATENT DOCUMENTS

| | | | |
|---|---|---|---|
| 2014/0221024 A1 | 8/2014 | Xu et al. | |
| 2014/0341014 A1 | 11/2014 | Kim et al. | |
| 2014/0370922 A1 | 12/2014 | Richards | |
| 2016/0066296 A1 | 3/2016 | Su et al. | |
| 2016/0088462 A1 | 3/2016 | Jin et al. | |
| 2019/0174571 A1* | 6/2019 | Deenoo | H04W 76/11 |
| 2019/0215800 A1* | 7/2019 | Fujishiro | H04W 48/18 |

OTHER PUBLICATIONS

"Revision of WI: Signalling Reduction to Enable Light Connection for LTE", 3GPP TSG-RAN meeting #72, RP-160937, Agenda: 10.2.4, Huawei, Jun. 13-17, 2016, 7 pages.

"3rd Generation Partnership Project; Technical Specification Group Core Network and Terminals; Non-Access-Stratum (NAS) protocol for Evolved Packet System (EPS); Stage 3 (Release 14)", 3GPP TS 24.301, V14.0.1, Jun. 2016, pp. 1-452.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.2.0, Jun. 2016, pp. 1-623.

International Search Report and Written Opinion received for corresponding Patent Cooperation Treaty Application No. PCT/FI2017/050644, dated Nov. 17, 2017, 20 pages.

First Office Action issued in corresponding Chinese Patent Application No. 2021040702439380 dated Apr. 12, 2021, with English summary thereof.

Second Office Action issued in corresponding Chinese Patent Application No. 201780060373.X dated Sep. 27, 2021, with English summary thereof.

Communication pursuant to Article 94(3) EPC issued in corresponding European Patent Application No. 17855068.7 dated Dec. 1, 2021.

Huawei et al., "On RAN initiated paging", 3GPP Draft; R2-165250, 3rd Generation Partnership Project; vol. RAN WG2, Aug. 12, 2016; Retrieved from the Internet: URL: http://www/3gpp.org/ftp/tsg_ran/WG2_RL2/TSGR2_95/Docs/.

* cited by examiner

PAGING AREA UPDATE FAILURE HANDLING

RELATED APPLICATION

This application was originally filed as PCT Application No. PCT/FI2017/050644 on Sep. 11, 2017, which claims priority from U.S. application 62/401,488, filed Sep. 29, 2016.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology. Some embodiments may generally relate to light connection (LC) paging area update (PAU) in such communications networks, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3 GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method that may include configuring, by a network node, a user equipment in UE centric mobility mode. Failure of a paging area update procedure is handled in an access stratum layer.

According to an embodiment, the UE centric mobility mode is a light connection mode or RRC_inactive state. According to another embodiment, the paging area update procedure is triggered when the user equipment moves out of the configured UE centric mobility area. The method may also include configuring a timer to detect the paging area update failure.

In one embodiment, the paging area update failure is detected when a number of paging area update attempts exceeds maximum reach a given value. According to an embodiment, the configuring of the timer comprises configuring a retransmission timer that allows the user equipment to attempt to retry a location update to the network x times. In another embodiment, the configuring of the timer comprises configuring a guard timer that is initiated when a first paging area updated attempt is started. According to an embodiment, the method may further include performing certain actions for dealing with the paging area update failure.

In an embodiment, the method may further include sending an indication about the paging area update failure from the access stratum layer to non-access stratum layer. According to one embodiment, the method may also include initiating a tracking area update procedure by the non-access stratum layer when a suitable cell is found after the paging area update failure. In one embodiment, the method further includes moving to idle mode and removing existing UE context when the paging area update failure has been detected.

Another embodiment is directed to an apparatus including at least one processor, and at least one memory including computer program code. The at least one memory and the computer program code may be configured, with the at least one processor, to cause the apparatus at least to configure a user equipment in UE centric mobility mode, wherein failure of a paging area update procedure is handled in an access stratum layer.

Another embodiment is directed to an apparatus that may include configuring means for configuring a user equipment in UE centric mobility mode, wherein failure of a paging area update procedure is handled in an access stratum layer.

According to an embodiment, the UE centric mobility mode is a light connection mode or RRC_inactive state. In one embodiment, the paging area update procedure is triggered when the user equipment moves out of the configured UE centric mobility area.

In an embodiment, the apparatus may further include timer configuring means for configuring a timer to detect the paging area update failure. According to one embodiment, the paging area update failure is detected when a number of paging area update attempts exceeds maximum reach a given value. In an embodiment, the timer configuring means comprises means for configuring a retransmission timer that allows the user equipment to attempt to retry a location update to the network x times. According to another embodiment, the timer configuring means comprises means for configuring a guard timer that is initiated when a first paging area updated attempt is started.

In one embodiment, the apparatus may further include performing means for performing certain actions for dealing with the paging area update failure. According to an embodiment, the apparatus may further include sending means for sending an indication about the paging area update failure from the access stratum layer to non-access stratum layer. In an embodiment, the apparatus may further include initiating means for initiating a tracking area update procedure by the non-access stratum layer when a suitable cell is found after the paging area update failure. According to one embodiment, the apparatus may further include moving means for moving to idle mode and removing existing UE context when the paging area update failure has been detected.

Another embodiment is directed to a method that may include initiating, by a UE, a timer for PAU in AS to retry a location update to the network. The method may include moving to idle mode based on the timer. For example, in one embodiment, the timer may be a retransmission timer that allows UE to attempt to retry a location update to the network X times. According to another embodiment, the timer is a guard timer that may be initiated when a first PAU attempt is started. In one embodiment, the method may also include sending, to the network, an indication of failed PAU. After entering the idle mode due to PAU failure, the method may include continuing with idle mobility mode with re-selections trying to camp to a suitable cell.

Another embodiment is directed to an apparatus including at least one processor, and at least one memory including computer program code. The at least one memory and the computer program code may be configured, with the at least one processor, to cause the apparatus at least to initiate a timer for PAU in AS to retry a location update to the network. The at least one memory and the computer program code may be further configured, with the at least one processor, to cause the apparatus at least to move to idle mode based on the timer. For example, in one embodiment, the timer may be a retransmission timer that allows the apparatus to attempt to retry a location update to the network X times. According to another embodiment, the timer is a guard timer that may be initiated when a first PAU attempt is started. In one embodiment, the at least one memory and the computer program code may be configured, with the at least one processor, to cause the apparatus at least to send, to the network, an indication of failed PAU. After entering the idle mode due to PAU failure, the at least one memory and the computer program code may be configured, with the at least one processor, to cause the apparatus at least to continue with idle mobility mode with re-selections trying to camp to a suitable cell.

Another embodiment is directed to an apparatus that may include initiating means for initiating a timer for PAU in AS to retry a location update to the network. The apparatus may also include moving means for moving to idle mode based on the timer. For example, in one embodiment, the timer may be a retransmission timer that allows UE to attempt to retry a location update to the network X times. According to another embodiment, the timer is a guard timer that may be initiated when a first PAU attempt is started. In one embodiment, the apparatus may also include sending means for sending, to the network, an indication of failed PAU. After entering the idle mode due to PAU failure, the apparatus may include continuing means for continuing with idle mobility mode with re-selections trying to camp to a suitable cell.

BRIEF DESCRIPTION OF THE DRAWINGS

For proper understanding of the invention, reference should be made to the accompanying drawings, wherein.

DETAILED DESCRIPTION

Figure 1A:
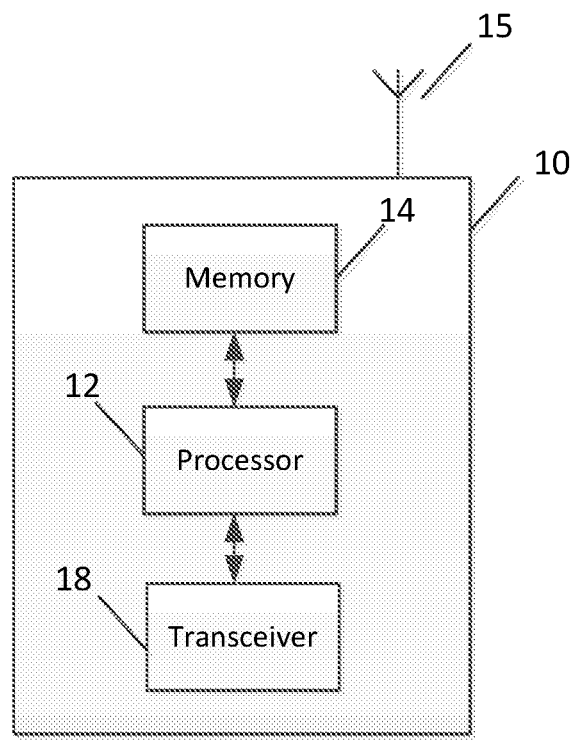
FIG. 1a illustrates an example block diagram of an apparatus, according to one embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for paging area update (PAU) failure handling, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The 3GPP work item (WI) entitled, "*Signalling reduction to enable light connection for LTE*" (RP-160937) has an objective of reducing signaling both over the radio interface and between network nodes. Additionally, an aim of this WI is to minimize latencies as well as UE power consumption for all device types.

Further, a similar state to what is currently known as RRC_INACTIVE is going to be defined for 5G (or New Radio, NR). The intention with light connection (LC) is to allow UE centric mobility, which means that the UE (without active data transmission) may be moved to "lightly connected" mode in which the UE context is stored both at the UE and in the radio access network (RAN) serving or "anchor" eNB. Mobility is based on re-selections (similar to idle state), instead of handovers like in connected mode. The LC mode may be limited to a certain area, e.g., within a number of cells, in which the re-selections are allowed without notifying the network (NW) or RAN. When the UE re-selects a cell belonging to another LC area, the UE may indicate to the NW (i.e., RAN) about its new location. Currently, it is open as to what signalling procedure will be used for the location indication, i.e., LC or paging area update (PAU).

It is also still for further study what signalling procedures shall be used to re-initiate mobile originating (MO) and mobile terminating (MT) data transmissions while in LC mode. However, the assumption is that for MO data, the UE may re-activate the connection either by a connection resume request message (in case connection was suspended with similar procedure as in the narrowband internet of things (NB-IOT) case) or may initiate a connection re-establishment procedure. It has been agreed that the MT data triggers paging when arriving to the anchor (old serving) eNB. Based on the final agreement on the support for multi-eNB LC (or paging) area, the anchor eNB may or may not distribute paging over the X2 connection to cells/eNBs belonging to the LC area.

Normally, a connection request is initiated by non-access stratum (NAS), but in the case of LC PAU the initiation will be done in the access stratum (AS). In the case where NAS initiates connection (e.g., TAU—tracking area update) and there is a failure to send the message (e.g., ACB, RRC connection reject, etc.) retransmission is handled by NAS. A problem that needs to be addressed is what the UE behavior would be in case PAU fails, as NAS is not aware of this procedure.

According to an embodiment, a UE may be configured to enter RRC_IDLE from LC mode in case of one failure of sending a PAU or X occasions of failure of sending a PAU, or when a timer configured for re-trying PAU expires. In one embodiment, this can be achieved by an AS indication to NAS about the failure with PAU so that NAS can inform (when the connection is again available) the core network (CN) about the UE being reachable only with regular paging from a mobility management entity (MME). Several options for implementing such operation are discussed herein.

According to one example embodiment, a retransmission timer for PAU is provided in the AS to retry location update to the network. The UE may try to update location X times, where the value of X may be standardized or configurable. In this embodiment, after X number of failures, the UE may transition from LC mode to idle mode (e.g., RRC_IDLE mode). For example, in an embodiment, the value of X may be 1, such that if the first attempt fails the recovery procedure is initiated. In another embodiment, the value of X may be 0 if the re-selected cell is barred and the UE does not attempt to access the cell. In other embodiments, X could be unlimited as well, but this may lead to endless retries. In other embodiments, X may be an integer greater than one. In certain embodiments, the UE would not retry sending if not camping on a cell.

It is noted that the failure of PAU transmission may be due to several causes. For example, failure may be caused by poor radio conditions; this can be considered as a temporary situation and in typical cases should be overcome by re-transmission. In other causes, access may be barred to the re-selected cell; in this case, the PAU re-transmissions are dependent on the barring time. In further situations, the UE may receive a rejection of the PAU for any reason the NW may have. According to certain embodiments, some of the existing cause values defined for TAU may be reused (e.g., see 3GPP technical specification (TS) 24.301). In other embodiments, new cause values may be specified for the PAU failure in LC mode.

In some embodiments, the UE AS may inform the NAS layer about the failed PAU. In addition, the NAS may also be informed about the cause of the failure. After being informed of the failure and possibly the cause, NAS may have different alternatives for how to proceed. For example, in one embodiment, NAS may take care of the removal of existing context stored for LC, both in the UE and the anchor eNB. In another embodiment, NAS may follow the procedures for corresponding failure/abnormal cases with TAU, as defined in 3GPP TS 24.301. Alternatively, new specific procedures may be defined for PAU failure, which may possibly vary depending on the "cause" indicated by AS.

In another embodiment, a guard timer may be provided for PAU in the AS to retry location update to the network. In this embodiment, the guard timer may be started when PAU attempt is started. When the guard timer expires, the UE may move from LC mode to idle mode (e.g., RRC_IDLE mode).

Certain embodiments provide options for the NAS recovery procedure in case of a PAU failure. In one embodiment, the UE enters idle mode (e.g., RRC_IDLE) as discussed above and the UE continues with idle mode mobility mode with re-selections trying to camp to a suitable cell. When suitable cell (which is not barred) is found, the UE may initiate TAU procedure and the CN becomes aware of the UE location and can release the existing connection that was left for the LC mode. The CN may then remove contexts in RAN stored for the LC mode, and also remove the old context and configurations (e.g., S1-U link between serving gateway (S-GW) and eNB) in CN. Alternatively or additionally, when suitable cell is found, the UE may initiate a new NAS signalling procedure specified for the PAU failure; this may follow the removal of the old contexts left from the previous LC mode.

In another embodiment, if the camped cell supports LC, the UE may re-try the PAU, or it may initiate connection resumption of the existing connection; in the latter case, the UE context may be fetched from the old anchor eNB. It may be dependent upon the eNB implementation as to whether the existing S1 connection is moved to new serving cell or if the connection is released or suspended.

FIG. 1a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. Thus, in certain embodiments, apparatus 10 may include a base station, access node, node B or eNB serving a cell. It should be noted that one of ordinary skill in the art would understand that apparatus 10 may include components or features not shown in FIG. 1a.

As illustrated in FIG. 1a, apparatus 10 may include a processor 12 for processing information and executing instructions or operations. Processor 12 may be any type of general or specific purpose processor. While a single processor 12 is shown in FIG. 1a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of LTE, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B or eNB, or an access node of 5G, for example. According to one embodiment, apparatus 10 may be controlled by memory 14 and processor 12 to perform the functions associated with embodiments described herein. For instance, in an embodiment, apparatus 10 may be controlled by memory 14 and processor 12 to configure a user equipment with a timer, such as a retransmission or guard timer, for PAU in AS to retry a location update to the network. In an embodiment, the user equipment may be in lightly connected mode (e.g., LC) when the retransmission or guard timer is initiated.

According to an embodiment, the timer configured by apparatus 10 for the UE is a retransmission timer that allows the user equipment to attempt to retry a location update to the network X times. After X number failures of PAU attempts, the UE is configured to move to idle mode (e.g., RRC_IDLE). According to another embodiment, the timer configured by apparatus 10 for the UE is a guard timer that may be initiated when a first PAU attempt is started. When the guard timer expires, the UE is configured to move to idle mode (e.g., RRC_IDLE).

In one embodiment, apparatus 10 may be controlled by memory 14 and processor 12 to receive, from the user equipment, an indication of the failed PAU. In addition, apparatus 10 may optionally be informed about the cause of the PAU failure. After being informed of the failure and possibly the cause, apparatus 10 may have different alternatives for how to proceed. For example, in one embodiment, apparatus 10 may be controlled by memory 14 and processor 12 to take care of the removal of existing context stored for LC, both in the UE and an anchor eNB. In another embodiment, apparatus 10 may be controlled by memory 14 and processor 12 to follow the procedures for corresponding failure/abnormal cases with TAU, for example as defined in 3GPP TS 24.301. Alternatively, new specific procedures may be defined for PAU failure, which may possibly vary depending on the "cause" of the PAU failure.

Figure 1B:
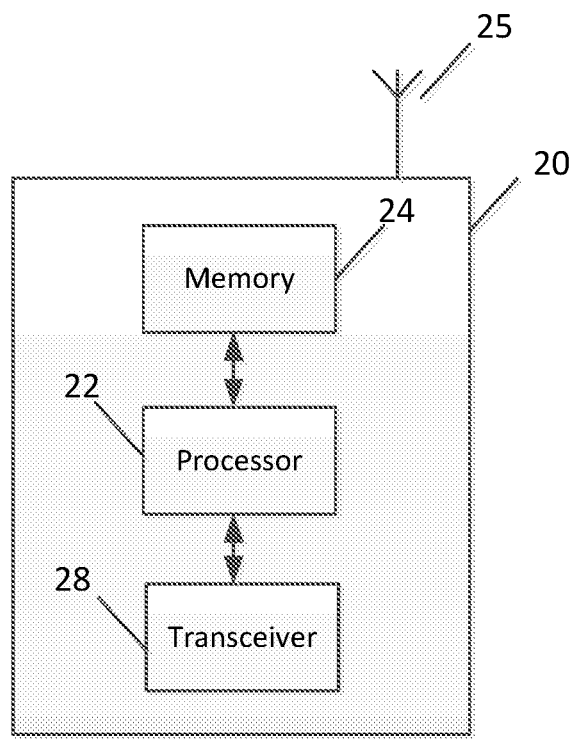
FIG. 1b illustrates an example block diagram of an apparatus, according to another embodiment.

FIG. 1b illustrates an example of an apparatus 20 according to another embodiment. In an embodiment, apparatus 20 may be a node or element in a communications network or associated with such a network, such as a UE, mobile device, stationary device, or other device. A UE may alternatively be referred to as, for example, a mobile station, mobile unit, mobile device, user device, subscriber station, wireless terminal, tablet, smart phone, or the like. Apparatus 20 may be implemented as, for example, a wireless handheld device, a wireless plug-in accessory, or the like. In some example embodiments, apparatus 20 may include one or more processors, one or more computer-readable storage medium (for example, memory, storage, and the like), one or more radio access components (for example, a modem, a transceiver, and the like), and/or a user interface.

In some embodiments, apparatus 20 may be a UE configured to operate using one or more radio access technologies, such as LTE, LTE-A, 5G, WLAN, WiFi, Bluetooth, NFC, and any other radio access technologies. Moreover, apparatus 20 may be configured to have established connections to access points using a plurality of the radio access technologies. It should be noted that one of ordinary skill in the art would understand that apparatus 20 may include components or features not shown in FIG. 1b.

As illustrated in FIG. 1b, apparatus 20 may include a processor 22 for processing information and executing instructions or operations. Processor 22 may be any type of general or specific purpose processor. While a single processor 22 is shown in FIG. 1b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink or signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, for example. In this embodiment, apparatus 20 may be controlled by memory 24 and processor 22 to perform the functions associated with embodiments described herein. In one embodiment, apparatus 20 may be controlled by memory 24 and processor 22 to initiate a timer, such as a retransmission or guard timer, for PAU in AS to retry a location update to the network. In an embodiment, the apparatus 20 may be in lightly connected mode (e.g., LC) when the retransmission or guard timer is initiated.

According to an embodiment, the timer may be a retransmission timer that allows the apparatus 20 to attempt to retry a location update to the network X times. After X number failures of PAU attempts, apparatus 20 may be controlled by memory 24 and processor 22 to move to idle mode (e.g., RRC_IDLE). According to another embodiment, the timer is a guard timer that may be initiated when a first PAU attempt is started. When the guard timer expires, apparatus 20 may be controlled by memory 24 and processor 22 to move to idle mode (e.g., RRC_IDLE).

In one embodiment, apparatus 20 may be controlled by memory 24 and processor 22 to send, to the network (e.g., NAS layer), an indication of the failed PAU. In addition, apparatus 20 may be controlled by memory 24 and processor 22 to optionally be inform the network about the cause of the PAU failure.

After entering the idle mode due to PAU failure, apparatus 20 may be controlled by memory 24 and processor 22 to continue with idle mobility mode with re-selections trying to camp to a suitable cell. When suitable cell (which is not barred) is found, apparatus 20 may be controlled by memory 24 and processor 22 to initiate TAU procedure and the CN becomes aware of the apparatus 20 location and can release the existing connection that was left for the LC mode. The CN may then remove contexts in RAN stored for the LC mode, and also remove the old context in CN. Alternatively or additionally, when suitable cell is found, apparatus 20 may be controlled by memory 24 and processor 22 to initiate a new NAS signalling procedure specified for the PAU failure; this may follow the removal of the old contexts left from the previous LC mode.

In another embodiment, if the camped cell supports LC, apparatus 20 may be controlled by memory 24 and processor 22 to re-try the PAU, or initiate connection resumption of the existing connection; in the latter case, the UE context may be fetched from the old anchor eNB.

Figure 2A:
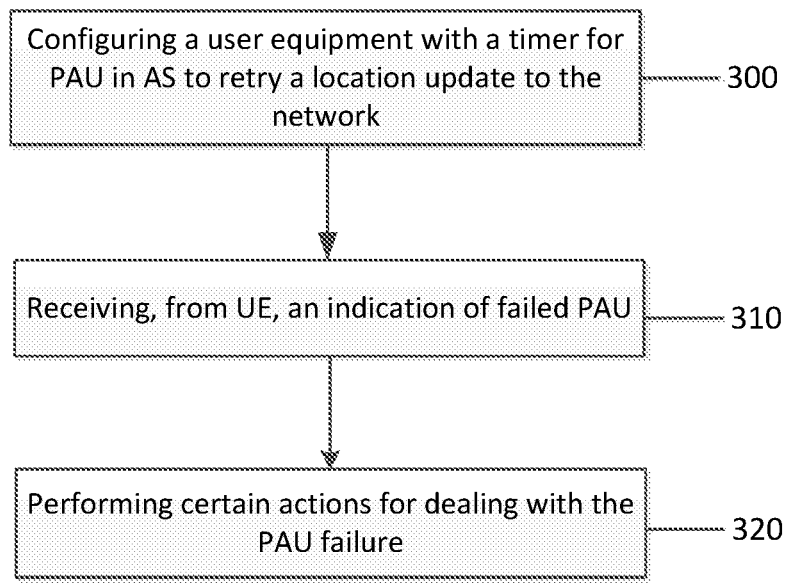
FIG. 2a illustrates an example flow diagram of a method, according to one embodiment.

FIG. 2a illustrates an example flow diagram of a method, according to one embodiment. The method may be performed by a base station, eNB, or access node, for example. The method of FIG. 2a may include, at 300, configuring a user equipment with a timer, such as a retransmission or guard timer, for PAU in AS to retry a location update to the network. In an embodiment, the user equipment may be in lightly connected mode (e.g., LC) when the retransmission or guard timer is initiated.

According to an embodiment, the configuring of the timer may include configuring a retransmission timer that allows the user equipment to attempt to retry a location update to the network X times. After X number failures of PAU attempts, the UE is configured to move to idle mode (e.g., RRC_IDLE). According to another embodiment, the configuring of the timer may include configuring a guard timer that may be initiated when a first PAU attempt is started. When the guard timer expires, the UE is configured to move to idle mode (e.g., RRC_IDLE).

In one embodiment, the method of FIG. 2a may also include, at 310, receiving, from the user equipment, an indication of failed PAU. In addition, the receiving may optionally include receiving information about the cause of the PAU failure. After being informed of the failure and possibly the cause, the method may include, at 320, performing certain actions for dealing with the PAU failure. For example, in one embodiment, the performing of certain actions may include removal of existing context stored for LC, both in the UE and an anchor eNB. In another embodiment, the performing of certain actions may include following the procedures for corresponding failure/abnormal cases with TAU, for example as defined in 3GPP TS 24.301. Alternatively, new specific procedures may be defined for PAU failure, which may possibly vary depending on the "cause" of the PAU failure.

Figure 2B:
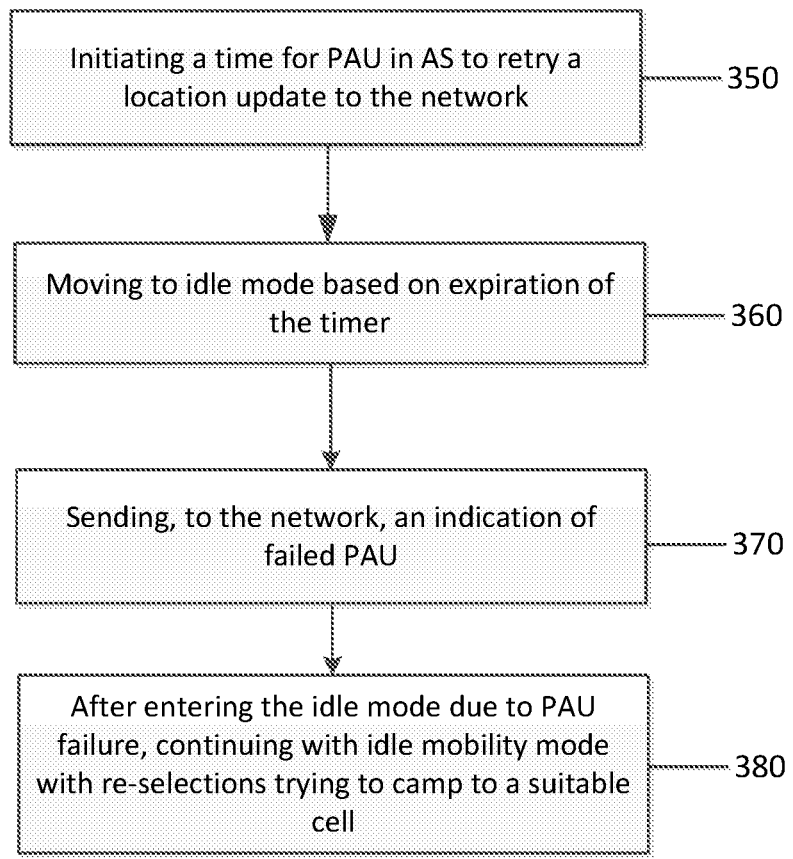
FIG. 2b illustrates an example flow diagram of a method, according to another embodiment.

FIG. 2b illustrates an example flow diagram of a method, according to one embodiment. The method may be performed by a UE or mobile station, for example. The method of FIG. 2b may include, at 350, initiating a timer, such as a retransmission or guard timer, for PAU in AS to retry a location update to the network. In an embodiment, the UE may be in lightly connected mode (e.g., LC) when the retransmission or guard timer is initiated.

According to an embodiment, the method may include, at 360, moving to idle mode based on expiration of the timer. For example, in one embodiment, the timer may be a retransmission timer that allows UE to attempt to retry a location update to the network X times. After X number failures of PAU attempts, the method may include, at 360, moving to idle mode (e.g., RRC_IDLE). According to another embodiment, the timer is a guard timer that may be initiated when a first PAU attempt is started. When the guard timer expires, the method may include, at 360, moving to idle mode (e.g., RRC_IDLE).

In one embodiment, the method may also include, at 370, sending, to the network (e.g., NAS layer), an indication of failed PAU. In addition, the sending may optionally include informing the network about the cause of the PAU failure.

After entering the idle mode due to PAU failure, the method may include, at 380, continuing with idle mobility mode with re-selections trying to camp to a suitable cell. When a suitable cell (which is not barred) is found, the method may include initiating TAU procedure and the CN becomes aware of the UE location and can release the existing connection that was left for the LC mode. The CN may then remove contexts in RAN stored for the LC mode, and also remove the old context in CN. Alternatively or additionally, when suitable cell is found, the method may include initiating a new NAS signalling procedure specified for the PAU failure; this may follow the removal of the old contexts left from the previous LC mode.

In another embodiment, if the camped cell supports LC, the method may include re-trying the PAU, or initiating connection resumption of the existing connection; in the latter case, the UE context may be fetched from the old anchor eNB.

Embodiments of the invention provide several technical improvements and/or technical effects. For example, embodiments of the invention remove the possibility of non-synchronized states at the UE and in the network after a failure with the paging area update. Certain embodiments also remove the non-usable contexts that may be left from the previous LC. As a result, embodiments of the invention can improve performance and throughput of network nodes including, for example, eNBs and UEs. As a result, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One embodiment is directed to a method performed by network node. The method may include configuring a user equipment in LC mode with a timer for PAU in AS to retry a location update to the network. According to an embodiment, the configuring of the timer may include configuring a retransmission timer that allows the user equipment to attempt to retry a location update to the network X times. According to another embodiment, the configuring of the timer may include configuring a guard timer that may be initiated when a first PAU attempt is started. In one embodiment, the method may also include receiving, from the user equipment, an indication of failed PAU. The method may also include performing certain actions for dealing with the PAU failure.

Another embodiment is directed to an apparatus including at least one processor, and at least one memory including computer program code. The at least one memory and the computer program code are configured, with the at least one processor, to cause the apparatus at least to configure a user equipment in LC mode with a timer for PAU in AS to retry a location update to the network. According to an embodiment, the configuring of the timer may include configuring a retransmission timer that allows the user equipment to attempt to retry a location update to the network X times. According to another embodiment, the configuring of the timer may include configuring a guard timer that may be initiated when a first PAU attempt is started. In one embodiment, the at least one memory and the computer program code are configured, with the at least one processor, to cause the apparatus at least to receive, from the user equipment, an indication of failed PAU and to perform certain actions for dealing with the PAU failure.

Another embodiment is directed to a method that may be performed by a UE. The method may include initiating a timer for PAU in AS to retry a location update to the network. The method may include moving to idle mode based on the timer. For example, in one embodiment, the timer may be a retransmission timer that allows UE to attempt to retry a location update to the network X times. According to another embodiment, the timer is a guard timer that may be initiated when a first PAU attempt is started. In one embodiment, the method may also include sending, to the network, an indication of failed PAU. After entering the idle mode due to PAU failure, the method may include continuing with idle mobility mode with re-selections trying to camp to a suitable cell.

Another embodiment is directed to an apparatus including at least one processor, and at least one memory including computer program code. The at least one memory and the computer program code are configured, with the at least one processor, to cause the apparatus at least to initiate a timer for PAU in AS to retry a location update to the network. The at least one memory and the computer program code are further configured, with the at least one processor, to cause the apparatus at least to move to idle mode based on the timer. For example, in one embodiment, the timer may be a retransmission timer that allows the apparatus to attempt to retry a location update to the network X times. According to another embodiment, the timer is a guard timer that may be initiated when a first PAU attempt is started. In one embodiment, the at least one memory and the computer program code are configured, with the at least one processor, to cause the apparatus at least to send, to the network, an indication of failed PAU. After entering the idle mode due to PAU failure, the at least one memory and the computer program code are configured, with the at least one processor, to cause the apparatus at least to continue with idle mobility mode with re-selections trying to camp to a suitable cell.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
at least one processor; and
at least one memory including computer program codes,
the at least one memory and the computer program codes are configured, with the at least one processor, to cause the apparatus at least to:
configure a user equipment for a paging area update procedure in a user equipment centric mobility mode, wherein failure of the paging area update procedure is handled in an access stratum layer,
wherein the configuring the user equipment for the paging area update procedure comprises configuring a timer to detect the failure of the paging area update procedure, and configuring the timer to cause the user equipment to move to an idle mode based on the timer.

2. The apparatus according to claim 1, wherein the user equipment centric mobility mode includes a light connection mode or an RRC_inactive state.

3. The apparatus according to claim 1, wherein the paging area update procedure is triggered when the user equipment moves out of a configured user equipment centric mobility area.

4. The apparatus according to claim 1, wherein the timer comprises a guard timer that is initiated when a first paging area updated attempt is started.

5. An apparatus, comprising:
at least one processor; and
at least one memory including computer program codes,
the at least one memory and the computer program codes are configured, with the at least one processor, to cause the apparatus at least to
receive, from a network device, a configuration for a paging area update procedure in a user equipment centric mobility mode, and
handle failure of the paging area update procedure in an access stratum layer based on the configuration,
wherein the configuration comprises a timer to detect the failure of the paging area update procedure,
wherein the handling the failure of the paging area update procedure comprises initiating the timer for paging area update in the access stratum layer to detect the failure of the paging area update procedure, and moving to an idle mode based on the timer,
wherein the timer comprises a guard timer that is initiated when a first paging area update attempt is started, and
wherein the handling the failure of the paging area update procedure comprises entering an idle mode when the guard timer expires.

6. The apparatus according to claim 5, wherein the handling the failure of the paging area update procedure comprises:
sending an indication about the failure of the paging area update procedure from the access stratum layer to non-access stratum layer.

7. The apparatus according to claim 5, wherein the user equipment centric mobility mode includes a light connection mode or an RRC_inactive state.

8. The apparatus according to claim 5, wherein the apparatus is further caused to:
trigger the paging area update procedure when the apparatus moves out of a configured user equipment centric mobility area.

9. A method implemented by a user equipment, comprising:
receiving, from a network device, a configuration for a paging area update procedure in a user equipment centric mobility mode, and
handling failure of the paging area update procedure in an access stratum layer based on the configuration, wherein the configuration comprises a timer to detect the failure of the paging area update procedure, wherein the handling failure of the paging area update procedure comprises initiating the timer for paging area update in the access stratum layer to detect the failure of the paging area update procedure, and moving to an idle mode based on the timer, wherein the timer comprises a guard timer that is initiated when a first paging area update attempt is started, and wherein the handling the failure of the paging area update procedure comprises entering an idle mode when the guard timer expires.

10. The method according to claim 9, wherein the handling failure of the paging area update procedure comprises:
sending an indication about the failure of the paging area update procedure from the access stratum layer to non-access stratum layer.

11. The method according to claim 9, wherein the user equipment centric mobility mode includes a light connection mode or an RRC_inactive state.

12. The method according to claim 9, further comprising:
triggering the paging area update procedure when the user equipment moves out of a configured user equipment centric mobility area.

* * * * *